May 5, 1959

C. C. RIVAS 2,885,487

FILM EDITING MACHINE

Filed July 11, 1958

INVENTOR.
CARLOS C. RIVAS
BY
*[signature]*
—ATTORNEY—

May 5, 1959
C. C. RIVAS
2,885,487
FILM EDITING MACHINE
Filed July 11, 1958
2 Sheets-Sheet 2
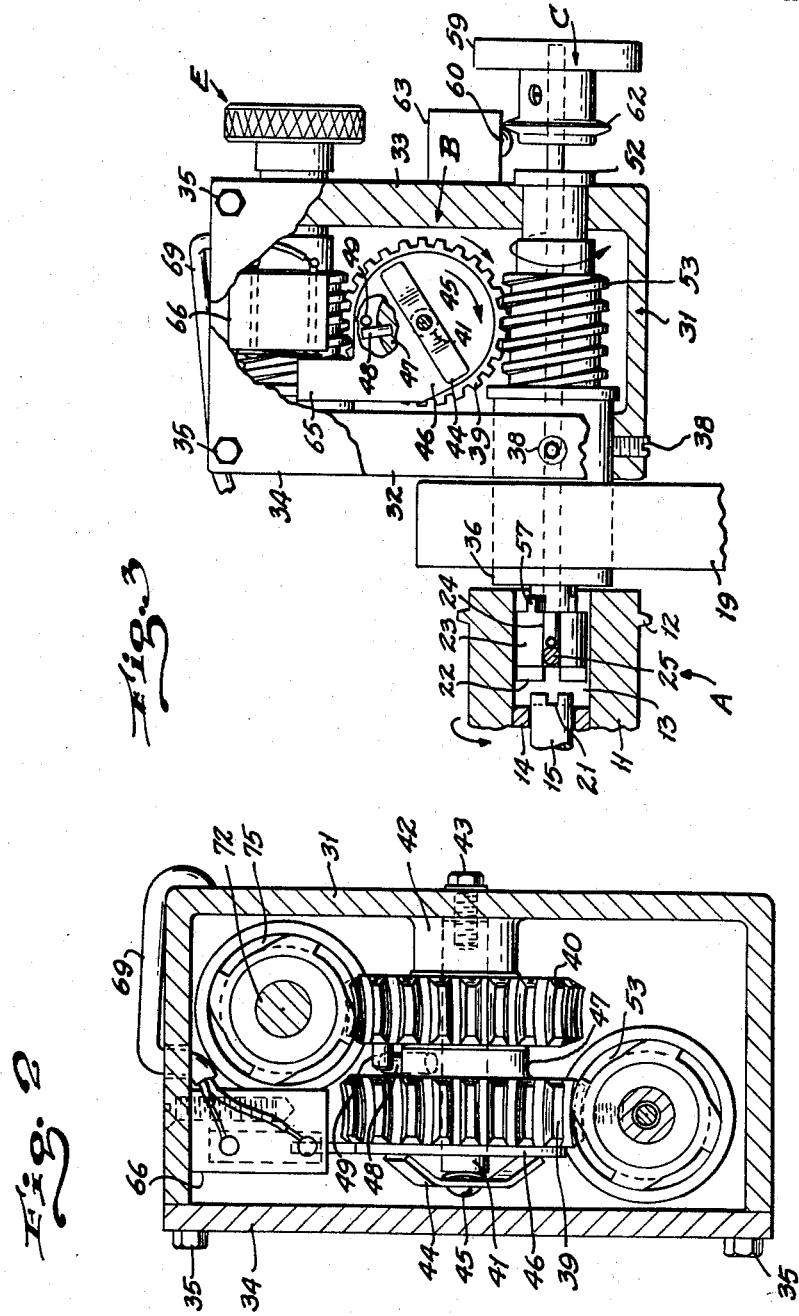
INVENTOR.
CARLOS C. RIVAS
BY
ATTORNEY

United States Patent Office 2,885,487
Patented May 5, 1959

2,885,487
FILM EDITING MACHINE
Carlos C. Rivas, Culver City, Calif.

Application July 11, 1958, Serial No. 748,052

13 Claims. (Cl. 179—100.1)

This invention relates to film editing machines such as are employed in editing the sound record track of movie film for locating thereon any desired sounds requiring marking for deletion or other special treatment. The invention deals particularly with the problem of pin-pointing the location, on the film, of the exact limits of a particular section of sound track to be marked, and has as its general object to provide an improved apparatus for facilitating the manipulation of a section of film past the sound pickup head of the editing machine in a manner to enable the editor to rapidly locate the exact limits of a selected section of sound track.

More particularly, the invention is applied to a sound record editing machine of a type wherein there is provided film driving means such that the film may be moved alternately in opposite directions in a succession of scanning passes through a sound gate and which incorporates means for rendering a sound reproducer operative to reproduce sound from the sound track of the film during scanning movement in one direction only. Instead of utilizing a two-way driving apparatus employed in existing editing machines, the present invention provides a powered drive in one direction only and incorporates a drive transmission including a friction clutch which permits the operator to manually reverse the film movement by grasping the film and drawing it in a reverse movement overriding the continually applied forward drive of the motor operated drive mechanism. This makes it possible (a) to speed up the reversal of film movement and (b) to obtain greatly increased accuracy in the extent of reverse movement of the film past the sound gate; and each of these improved effects is an important object of this invention.

A further object is to provide, in such an improved film manipulating apparatus, a means for stopping the forward travel of the film past the sound gate while slipping forward drive continues to be applied to the film sprocket, said means being rapidly adjustable between successive scanning passes of the film, whereby the operator can rapidly adjust the stopping point to selected beginning and terminal limits of a section of sound track and can then accurately mark the film to indicate said limits as determined by the positions where the film has stopped in the sound gate.

Another important object of the invention is to provide a film manipulating apparatus which will effect reproduction of sound at its true original pitch at the beginning of each scanning pass, with no noticeable acceleration period in the beginning of film movement. This is accomplished by providing for full speed drive constantly applied to the film at all times, combined with means for allowing the film to be manually reversed and then released, with a full speed forward drive being applied to the film immediately upon such release.

Other objects and advantages will become apparent in the ensuing specification and appended drawing in which:

Fig. 2 is a transverse sectional view of the same taken on the line 2—2 of Fig. 1; and Fig. 3 is a fragmentary front elevation of the control apparatus of the invention, partially broken away and shown in section.

General description of invention

Figure 1:
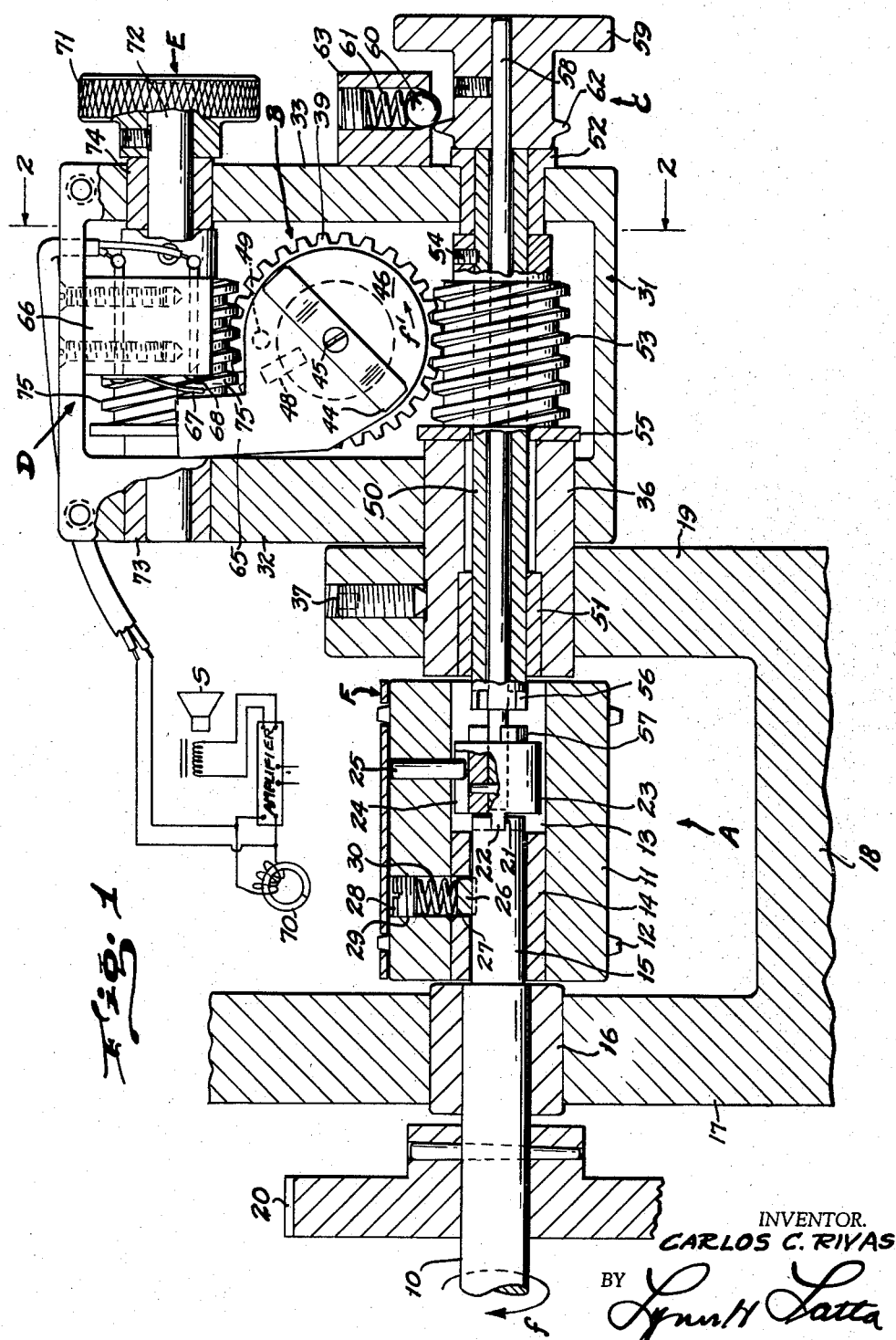
Fig. 1 is an axial sectional view of a film manipulating apparatus embodying my invention.

Referring now to the drawings in detail, I have shown therein as an example of one form in which the invention may be employed, a film manipulating and control apparatus embodying, in general, a film driving sprocket assembly A for driving the film through the editing machine, said sprocket assembly incorporating a friction clutch through which drive from a constantly rotating motor driven drive shaft 10 is continuously applied to a film drive sprocket 11; a stop mechanism B; a shiftable transmission C for selectively transmitting (a) positive drive from drive shaft 10 to sprocket 11, (b) positive drive from sprocket 11 to the stop unit B, while friction drive is transmitted from drive shaft 10 to sprocket 11; sound cut-off mechanism D actuated through transmission C; and manual adjustment means E for adjusting the terminal point of a scanning pass, where the stop mechanism B acts to arrest the film.

Detailed description—Sprocket assembly A

The sprocket assembly A comprises the cylindrical sprocket 11, with drive teeth 12 and an axial bore 13 in one end of which is secured, by a press-fit, an oilite bearing bushing 14. Through the bushing 14, sprocket 11 is rotatably mounted upon a trunnion 15 which is an integral reduced end portion of the drive shaft 10. Drive shaft 10 in turn is journalled in a bearing bushing 16 mounted in a bracket arm 17 of the sound gate portion 18 of the editing machine frame casting. Sound gate 18 has a second bracket arm 19. Shaft 10 receives drive from the motor of the editing machine through means which may include a gear 20 secured thereon as shown.

The end of trunnion 15 is provided with a diametral slot 21 (or a pair of such slots in crossed relation as indicated) adapted to receive a diametral driving tooth 22 on one end of a shiftable dog clutch collar 23 which is slidably mounted in the end portion of bore 13 beyond bushing 14. Collar 23 has a longitudinal keyway 24 which receives a key pin 25 secured in a radial bore in sprocket 11. Thus the collar 23 is keyed to the sprocket 11 for positive transmission of drive thereto from the drive shaft 10 when the clutch tooth 22 is engaged in a clutch slot 21. The keyed connection is a sliding one permitting the collar 23 to be shifted axially to disengage the tooth 22 from its clutching connection with shaft 10.

When this positive drive connection is thus declutched, a friction drive will be transmitted from drive shaft 10 to the oilite bearing 14 and thence to the sprocket 11, by means of a friction clutch pad 26 which has an arcuate clutch face frictionally bearing against the lateral wall of trunnion 15 and which is caged in a radial aperture 27 in the bushing 14 so as to transmit thereto the driving torque derived from its frictional drag against the surface of trunnion 15. This frictional drag can be adjusted by means of an adjusting screw 28 which is threaded into a radial bore 29 in the sprocket 11 (registering with aperture 27) and which compressively loads a coil spring 30 disposed within the bore 29.

At this point it may be noted that with the clutch collar 23 clutched to trunnion 15, positive drive will be transmitted to sprocket 11 and that when the collar 23 is declutched from drive shaft 10 and clutched to tubular shaft 50, friction drive will be transmitted to the sprocket 11 so long as drive shaft 10 rotates, and under this condition it will be possible for the operator to grasp the stretch of film F passing through the sound gate 18 and meshing with sprocket teeth 12, and, by pulling the film in the reverse direction (with respect to the forward drive applied to the sprocket) to draw the film rearwardly, counter to such forward drive, and to then release the film for renewed forward drive which will instantaneously be applied to the sprocket 11 from the drive shaft 10, rotating at full speed.

*Stop mechanism B*

The stop mechanism B (Figs. 2 and 3) is housed within a casing comprising a rectangular box 31 having vertical side members 32 and 33, and a front opening which is closed by a vertical cover plate 34 detachably secured thereto by screws 35. The box 31 is secured to vertical bracket arm 19 of the sound gate 18 by means of a sleeve 36. One end of the sleeve 36 is snugly received in a bore in bracket arm 19, coaxial with bearing bushing 16, and is anchored thereto by a set screw 37. The other end of sleeve 36 is snugly received in a bore in the side member 32 of box 31, and is secured thereto in any suitable manner, as by set screw 38.

The stop mechanism B comprises a pair of worm-tooth gears 39 and 40 independently rotatable upon a stub shaft 41 which is secured to the back of casing box 31 (e.g. by having its rear end mounted in an integral boss 42 thereon and being anchored in the boss by a cap screw 43). The gears 39 and 40 are retained in adjacent assembly by a spring yoke 44 attached to the end of stub shaft 41 by a fastener (e.g. screw) 45 and having diametrically opposite fingers yieldingly pressing against a non-metallic disc 46 which in turn bears against the forward face of gear 39 with a frictional engagement; the gear 39 having an integral hub 47 which bears against the forward face of gear 40 (either directly or through an interposed bearing washer as indicated); and the gear 40 in turn bearing against the forward end of boss 42 (either directly or through the interposed bearing washer shown in Fig. 2).

Secured on the hub 47 of gear 39 and projecting radially therefrom is a stop pin 48. Secured in the gear 40 and projecting forwardly from the forward face thereof, parallel to the axis of stub shaft 41, is a stop pin 49, which is disposed in the path of rotation of stop pin 48 and is adapted to be engaged thereby to determine a limit of forward drive of the film in a scanning pass thereof through the editing machine.

The stopping point can be adjusted with reference to the sprocket 11 (and thus with reference to the film) by shifting the position of pin 49 through manipulation of adjusting unit E as will be described more particularly hereinafter.

*Shiftable transmission C*

The transmission mechanism C comprises a tubular shaft 50 journalled at one end in a bushing 51 which is secured by a press-fit in a counterbore in sleeve 36; and journalled at its other end in a bushing 52 secured in an aligned bore in the side wall member 33 of the casing box 31. The shaft 50 extends through a drive worm 53 which is secured thereto as by a set screw 54 and is embraced between the inner ends of bushing 52 and of sleeve 36 (either directly engaging the latter or positioned against an interposed bearing washer 55) with just enough end clearance for free rotation. Thus the shaft 50 is fixed against axial shifting movement while free to rotate in bushings 51 and 52. One end of shaft 50 extends into the open portion of the bore 13 of sprocket 11 and is provided with dog clutch teeth 56 adapted to mesh with dog clutch teeth 57 on the adjacent end of collar 23 when the latter is declutched from drive shaft 10. Thus there may be established a positive drive connection between sprocket 11 and worm 53, when the positive drive connection between the sprocket and drive shaft is released.

Extending into collar 23 and secured thereto (as by means of the pin shown in Fig. 1) is a shift rod 58. Rod 58 extends through the tubular shaft 50 and has a projecting end to which is secured a knob 59. Alternative positions of knob 59 are determined by the yielding engagement of a detent ball 60, spring loaded by a coil spring 61, against a radial detent flange 62 on the hub of knob 59. The ball 60 and spring 61 are retained in the bore in a bracket 63 which is externally attached to the side member 33 of the casing box 31, the retaining bore having a constricted lower end providing a seat for the ball in its projected position.

When the flange 62 is leftward of ball 60, the clutch collar 23 will be yieldingly retained in clutching engagement with drive shaft 10; whereas with the flange 62 shifted to the other side of ball 60 (as shown in Fig. 3) the collar 23 will be declutched from shaft 10 and clutched with the end of tubular drive shaft 50. The knob 59 and stem 58 function not only for shifting the clutch collar 23, but may also be employed for manually rotating the sprocket 11 in an intermediate position of collar 23 when it is disengaged from both of the shafts 10 and 50.

The worm 53 meshes with the worm gear 39 so as to establish a reduction-drive connection between sprocket 11 and stop pin 48 when collar 23 is clutched to shaft 50.

*Sound cut off unit D*

Unit D includes the non-metallic disc 46, responding to friction drive transmitted to it from gear 39 through the yielding frictional engagement between that gear and disc 46 under the spring loading of yoke 44; a switch actuator finger 65 integral with and projecting tangentially from the disc 46; and a normally open switch 66 having a spring contact 67 positioned to engage a fixed contact 68 in response to pressure applied thereto by the actuator finger 65. Conductor connections 69 lead from switch 66 to the magnetic sound pickup head 70 of the editing machine which scans the sound track on film F (or to the speaker S of the sound system) and provides a shunt circuit which is open when the film is being driven forwardly, allowing the pickup head 70 to control the reproduction of sound in a speaker S through a suitable amplifier circuit, schematically indicated; and which closes when the film is manually backed up by the operator, thus short-circuiting the pickup head 70 or speaker S and cutting off the sound. With the machine turned on (e.g. by activating a motor control switch) the sound picked up by the pickup head 70 from that portion of the sound track which is being scanned, will be reproduced when the switch 66 is opened in response to movement of finger 65 counterclockwise as viewed in Fig. 1, whereas the sound will be cut off when the finger 65 moves in the clockwise direction. During forward rotation of sprocket 11 in the direction to drive the film forwardly (as indicated by arrow f in Fig. 1) by drive transmitted from sprocket 11 through tubular shaft 50, reduction worm gearing 53, 39 and the frictional drive between the latter and disc 46, the finger 65 will be oscillated away from the switch 66 to a stop position determined by contact with the casing wall 32, and the sound on the portion of sound track being scanned will be reproduced for the attention of the operator. The finger 65 will be oscillated into switch closing engagement with contact 67 when the operator is manually backing up the film, and the sound will be cut off during such back-up movement.

*Adjusting unit E*

Adjusting mechanism E comprises a manually operable knob 71 fixed on the end of shaft 72 which is journalled in bearing bushings 73 and 74 in the casing walls 32 and 33 and extends therebetween. Secured on the shaft 72 within the casing is a worm 75 which meshes with the worm gear 40. Thus there is provided a non-reversible drive connection between adjusting knob 71 and the gear 40 whereby the latter can be rotated to any selected position of adjustment while successive scannings are taking place to locate a sound spot; whereas the gear 40 will be locked in its position of adjustment by the non-driving engagement of its gear teeth against the thread of worm 75.

At this point it may be noted that in each pass of the film in a forwardly travelling scanning movement in which sound is being reproduced, such scanning movement will be abruptly stopped by engagement of stop pin 48 against stop pin 49, and the cut-off point of the scanning movement will be regulated by the position of adjustment of pin 49.

Operation

Briefly reviewing the basic object of the invention, which is to provide for quickly identifying a portion of sound track for editing or checking a selected sound recorded thereon while the same is being reproduced on the standard sound gate of an editing machine, it will be apparent that it is desirable to stop the travel of the film instantly when the selected sound is heard by the operator.

Normally, because of delay in operator response where the film is manually stopped when the selected sound is heard, the film will have advanced beyond the point on the sound track where the operator desires to mark the beginning or end of the selected sound, before the film is actually stopped; and this makes it necessary for the operator to repeatedly scan the section of film containing the selected sound in order to accurately pin-point the limits of the section of sound track on which the selected sound is recorded.

The present invention provides for a rapid succession of scanning passes over a selected section of sound track, in which the scanned area is adjusted after each pass until the terminal limit of a pass coincides exactly with a point to be marked in the selected sound. This procedure will be employed in scanning restricted areas of the film which are interspersed between more extended areas which can be reviewed in a single continuous scanning operation and allowed to pass without the necessity for locating them on the film. For such general continuous scanning, the apparatus provides for shifting the transmission unit C to establish a positive drive connection between the drive shaft 10 and the sprocket 11 and to simultaneously disconnect the stop mechanism B from the drive so that sprocket 11 can be driven continuously without being affected by the stop unit B.

Referring now to the apparatus of the invention, and assuming that the film has been properly loaded into the sound gate with its sprocket holes meshing with the sprocket teeth 12, the sound gate closed and the motor control switch for the machine closed to start the operation of the drive motor and the consequent rotation of drive shaft 10, the operator will start the general scanning operation by moving knob 59 leftward as viewed in Fig. 1 and thereby clutching collar 23 to drive shaft 10 so that positive drive will be transmitted to the sprocket 11 while the remainder of the apparatus (units B, C, D and E) is declutched and therefore inoperative. The film will then be driven forwardly and the sound will be reproduced at speaker S (the switch 66 being open by reason of the actuator finger 65 having been left in its withdrawn position of Fig. 1 at the end of a previous forward drive pass of the film followed by the leftward shifting of knob 59 without an intervening back-up operation). The operator will listen to the reproduced sound until he hears a sound that he is searching for. At this point, he breaks the positive drive between shaft 10 and sprocket 11 by shifting the clutch control knob 59 rightwardly, declutching collar 23 from shaft 10 and clutching it to shaft 50. Frictional drive torque will then be applied to sprocket 11 from drive shaft 10 through friction pad 26 and bushing 14, and from sprocket 11 through shaft 50 and reduction gearing 53, 39 to the stop pin 48 carried by gear 39, tending to rotate stop pin 48 counter-clockwise as indicated by arrow *f'* in Fig. 1. Assuming that stop pin 48 has previously been left in a position where stop pin 49 engages it so as to block forward rotation, the operator will grasp the stretch of film in the sound gate and pull it toward him, thus transmitting reverse movement from the film to the sprocket and thence through the shaft 50 and reduction gearing 53, 39 to the pin 48, returning the latter in a clockwise direction to a starting position which may be determined by contact of pin 48 against the other side of pin 49, or at any starting position short of such contact, selected by the operator so as to include enough of the sound being located so as to identify the same. During such back-up movement to such starting position, the sprocket 11 will be forcibly rotated counter to the rotation of shaft 10, the friction pad 26 slipping against trunnion 15 so as to yield to such counter rotation. At the commencement of the reverse drive from the film to gear 39, the friction clutching connection between the latter and the non-metallic disc 46 will immediately oscillate the actuator finger 65 into engagement with the switch contact 67, closing the switch 66 and shorting out the pickup head 70 or speaker S so as to cut out the sound during the back-up movement of the film. This is important in avoiding confusion of the operator resulting from the garbled sound that would be produced during the back-up movement if the pickup head or speaker S were allowed to remain operative.

When the selected length of film has been drawn back, the operator simply releases his grip upon the film and the friction drive through pad 26 will instantly establish forward drive from shaft 10 to sprocket 11 at full speed. Immediately the actuator finger 65 will be oscillated away from switch 66, which will open itself to remove the shunt from pickup head 70 or speaker S and start the sound reproduction simultaneously with the beginning of forward movement of the film. Since the film starts its forward movement at full speed, the sound will begin at normal pitch. A substantial length of film will be driven forwardly by the sprocket 11 while pin 48 rotates through somewhat less than a full circle and then engages pin 49, where such rotation will be stopped by the locked engagement of gear 40 with worm 75. Thus the forward rotation of sprocket 11 is abruptly stopped, ending the scanning pass of the sound track beneath the pick-up head 70 and abruptly cutting off the sound.

Assuming now that the operator wishes to locate the exact beginning of the section of sound track on which the selected sound is recorded, and that the sound was still heard in part during the scanning pass just ended, he will again grasp the film and back it up to a selected starting point judged by him to be ahead of the beginning of the selected sound, and will then rotate the adjusting knob 71 to move the stop pin (in a clockwise direction as viewed in Fig. 1) closer to the starting point of pin 48, and will release the film for another pass. The new scanning pass will proceed to the stopping point determined by the new position of pin 49, and if a portion of the selected sound remains, the operator will adjust the pin 49 to another new position, further advanced in a clockwise direction, to further advance the terminal point of the scanning pass and thereby cut off more of the sound as reproduced at speaker S, in another scanning pass which he will immediately initiate by grasping the film and again manually backing it up to a selected starting point. Thus, with a rapid succession of successively shifted scanning passes, the operator can gradually cut off succeeding portions of the selected sound until he has eliminated it entirely. At the precise point where the last trace of the selected sound disappears, the operator will allow the apparatus to remain stalled by the engagement of pin 48 against stop pin 49 (the drive shaft 10 can be allowed to continue its rotation during this interval) and will mark the film to precisely indicate the beginning of the selected sound.

Should the operator over-shift between scanning passes, he can reverse the direction of adjustment so as to correct the error, adjusting the stop pin 49 away from the starting point of pin 48 (counter-clockwise as viewed in Fig. 1), until he again hears the selected sound.

To sum up the foregoing briefly, in a series of scanning passes of a section of film, the operator, by controlling the angular position of the stop pin 49, can advance or retard at will the moment of contact of the pin 48 against the stop pin 49, depending upon what he hears at the moment the film stops. From this procedure, any required spot on the sound track can be accurately located and while the film remains stationary in the sound gate, this spot is conveniently and accurately marked to complete this stage of editing, and the apparatus can then be shifted into positive drive for a further general scanning operation.

In the appended claims, the film (or tape or wire or other equivalent flexible element) on which the sound track is carried, is designated broadly as a "sound record"; the sprocket (or other equivalent part) is broadly designated as a "record drive element"; and the drive shaft 10, a "driving part."

I claim:

1. In a sound track editing apparatus, for locating a selected sound as recorded on a sound record, in combination: a power actuated forward driving part; a record drive element; a sound pickup head positioned to be energized by said sound track during scanning movement of said record past said head, for actuating a sound reproducer; a friction drive connection between said part and element for continuously applying frictional driving torque to said record drive element so long as said driving part is power actuated, said friction drive connection being yieldable to permit back-up movement of said sound record when pulled manually by an operator to initiate a scanning pass of a section of said sound record past said pickup head; stop means for arresting forward movement of said record drive element for ending a scanning pass; and means for adjusting said stop means so as to vary the terminal points of successive scanning passes.

2. Editing apparatus as defined in claim 1, including means responsive to back-up movement of said record for rendering said sound pickup head inoperative to actuate said sound reproducer.

3. Editing apparatus as defined in claim 1, wherein said last mentioned means comprises an electric switch for automatically controlling an electrical circuit for said sound reproducer, an oscillatable actuator for actuating said switch to one position thereof, from which said switch is self-returnable to an alternate position, and a friction drive connection between said switch actuator and said record drive element adapted to oscillate said switch actuator in opposite directions in response to respective movements of said record drive element in forward and reverse directions.

4. In an apparatus for editing a sound track-bearing film, in combination: a forward driving part; a film drive sprocket associated therewith; a sound pickup head arranged to respond to the sound track on said film; a reproducer arranged to be actuated by said pickup head for reproducing the sound recorded on said sound track; a friction drive connection between said driving part and said sprocket, for constantly transmitting forward drive torque to said sprocket, said friction drive connection being yieldable to permit back-up movement of said film when pulled manually by an operator, for initiating a scanning pass of a section of said film past said pickup head; stop means for arresting forward movement of said sprocket for ending said scanning pass, said stop means including a rotatable stop part and a fixed stop part arranged to be engaged by said rotatable stop part; means for adjusting said fixed stop part to various fixed stop positions; means responsive to back-up movement of said sprocket for rendering said sound pickup head inoperative to actuate said sound reproducer; a transmission for transmitting drive from said sprocket to said back-up movement responsive means and to said rotatable stop part; a shiftable positive clutch including a clutch head having an axially shiftable driving connection with said sprocket and including means adapted, in one limit of axially shifting movement thereof to establish a driving connection to transmit from said sprocket to said transmission, both forward and reverse movements of said sprocket, with the forward drive being transmitted through the friction drive connection between said drive part and said sprocket, and adapted in its other limit of axial shifting movement to establish a positive drive connection between said drive part and said sprocket while releasing the drive connection between said sprocket and said transmission to render said stop means inoperative.

5. In an apparatus for editing a sound track-bearing film, in combination: a hollow film drive sprocket; a forward driving shaft extending into one end of said sprocket; a sound pickup head arranged to respond to the sound track on said film; a reproducer arranged to be actuated by said pickup head, including a speaker for reproducing the sound recorded on said sound track and an electrical circuit therefor; a friction drive pad carried by said sprocket and engaging said driving shaft, for constantly transmitting forward drive torque to said sprocket, said friction drive pad being yieldable to permit back-up movement of said film when pulled manually by an operator, for initiating a scanning pass of a section of said film past said pickup head; stop means for arresting forward movement of said sprocket for ending a scanning pass, said stop means including a rotatable stop part and a fixed stop part arranged to be engaged by said rotatable stop part; means for adjusting said fixed stop part to various fixed stop positions; means responsive to back-up movement of said sprocket for rendering said sound pickup head inoperative to actuate said sound reproducer, said last means comprising an electric switch for automatically controlling said electrical circuit, an oscillatable actuator for actuating said switch to one position thereof, from which said switch is self-returnable to an alternate position, and a friction drive means for transmitting driving torque to said oscillatable actuator; a transmission for transmitting drive from said sprocket to said oscillatable actuator friction drive means and to said rotatable stop part; and a shiftable positive clutch having an axially shiftable driving connection with said sprocket and including means adapted, in one limit of axially shifting movement thereof to engage said transmission to transmit from said sprocket to said transmission, both forward and reverse movements of said sprocket, with the forward drive being transmitted through the friction drive connection between said drive shaft and said sprocket, and adapted in its other limit of axially shifting movement to establish a positive drive connection between said drive shaft and said sprocket while releasing the drive connection between said sprocket and said transmission to render said stop means inoperative.

6. In an apparatus for editing a sound track-bearing film, in combination: a forward driving part; a film drive sprocket associated therewith; a sound pickup head arranged to respond to the sound track on said film; a reproducer arranged to be actuated by said pickup head for reproducing the sound recorded on said sound track; a friction drive connection between said driving part and said sprocket, for constantly transmitting forward drive torque to said sprocket, said friction drive connection being yieldable to permit back-up movement of said film when pulled manually by an operator, for initiating a scanning pass of a section of film past said pickup head; stop means for arresting forward movement of said film drive element for ending a scanning pass, said stop means including a rotatable stop part and a fixed stop part arranged to be engaged by said rotatable stop part; means for adjusting said fixed stop part to various fixed stop positions; means responsive to back-up movement of said film drive element for rendering said sound pickup head inoperative to actuate said sound reproducer, said last means comprising an electric switch for automatically controlling an electrical circuit for said sound reproducer, an oscillatable actuator for actuating said switch to one position thereof, from which said switch is self-returnable to an alternate position, and a friction drive means for transmitting driving torque to said oscillatable actuator; a transmission for transmitting drive from said sprocket to said oscillatable actuator friction drive means and to said rotatable stop part, said transmission including a tubular shaft having positive clutch means adjacent said sprocket, a worm on said tubular shaft and a worm gear driven by said worm and directly driving said rotatable stop part and said oscillatable actuator friction drive means; and a shiftable positive clutch including an actuator stem slideable in said tubular shaft and a clutch head secured to said stem, said clutch head having an axially shiftable driving connection with said sprocket and including means adapted, in one limit of axially shifting movement thereof to engage said clutch means of said tubular shaft to transmit from said sprocket to said worm gear, both forward and reverse movements of said sprocket, with the forward drive being transmitted through the friction drive connection between said drive part and said sprocket, and adapted in its other limit of axial shifting movement to establish a positive drive connection between said drive part and said sprocket while releasing the drive connection between said sprocket and said tubular shaft to render said stop means inoperative.

7. In a sound track editing apparatus, for locating a selected sound as recorded on a sound record, in combination: a power actuated forward driving part; a record drive element; a sound reproducer; a sound pickup head positioned to be energized by said sound track during scanning movement of said record past said head, for actuating said reproducer; a friction drive connection between said part and element for applying frictional driving torque to said record drive element; said friction drive connection being yieldable to permit back-up movement of said sound record when pulled manually by an operator to initiate a scanning pass of a section of said sound record past said pickup head; stop means for arresting forward movement of said record drive element for ending a scanning pass; means for adjusting said stop means so as to vary the terminal points of successive scanning passes; and means responsive to back-up movement of said record for rendering said sound reproducer inoperative.

8. In a sound track editing apparatus, for locating a selected sound as recorded on a sound record, in combination: a power actuated forward driving part; a record drive element; sound reproducing apparatus including an electrical circuit and a sound pickup head responsive to said sound track during scanning movement of said record past said head; a friction drive connection between said part and element for applying frictional driving torque to said record drive element; said friction drive connection being yieldable to permit back-up movement of said sound record when pulled manually by an operator to initiate a scanning pass of a section of said sound record past said pickup head; stop means for arresting forward movement of said record drive element for ending a scanning pass; and means for adjusting said stop means so as to vary the terminal points of successive scanning passes; means responsive to back-up movement of said record for rendering said sound pickup head inoperative to actuate said sound reproducer, said responsive means comprising an electric switch for automatically controlling said electrical circuit, an oscillatable actuator for actuating said switch, and a friction drive connection between said switch actuator and said record drive element adapted to oscillate said switch actuator in opposite directions in response to respective movements of said record drive element in forward and reverse direction.

9. In an apparatus for editing a sound track-bearing film, in combination: a hollow film drive sprocket; a forward driving shaft extending into one end of said sprocket; sound reproducing means including a sound pickup head arranged to respond to the sound track on said film; a friction drive pad carried by said sprocket and engaging said driving shaft, for constantly transmitting forward drive torque to said sprocket, said friction drive pad being yieldable to permit back-up movement of said film when pulled manually by an operator, for initiating a scanning pass of a section of said film past said pickup head; stop means for arresting forward movement of said film drive element for ending a scanning pass; means for adjusting said stop means for various fixed stop positions; means responsive to back-up movement of said film drive element for rendering said sound reproducing means inoperative; and means for transmitting drive from said sprocket to said back-up movement responsive means and to said stop means.

10. The combination defined in claim 9, wherein said sprocket has a radial bore therein, wherein said friction drive pad is mounted in said bore, and including means in said bore spring-loading said pad into frictional engagement with said driving shaft.

11. In a sound track editing apparatus, for locating a selected sound as recorded on a sound record, in combination: a power actuated forward driving part; a record drive element; a sound pickup head positioned to be energized by said sound track during scanning movement of said record past said head, for actuating a sound reproducer; a friction drive connection between said part and element for applying frictional driving torque to said record drive element; said friction drive connection being yieldable to permit back-up movement of said sound record when pulled manually by an operator to initiate a scanning pass of a section of said sound record past said pickup head; stop means for arresting forward movement of said record drive element for ending said scanning pass, said stop means including a pair of worm gears mounted for rotation on a common axis, stop projections carried by the respective worm gears in positions for interengagement, and a manually engageable adjusting member having a worm meshing with one of said gears for effecting adjustment of the stop projection of said one gear to various fixed stop positions; and a transmission including a shaft having a worm meshing with the other of said worm gears and a clutch head interposed between said transmission shaft and said driving part and selectively shiftable into positive clutching engagement with either said transmission shaft or said driving part while simultaneously disengaging the other.

12. The combination defined in claim 11, including means responsive to back-up movement of said record for rendering said sound pickup head inoperative to actuate said sound reproducer, said responsive means comprising an electric switch for automatically controlling an electrical circuit for said sound reproducer, an oscillatable disc having a radially projecting finger for actuating said switch to one position thereof, from which said switch is self-returnable to an alternate position; and a friction clutching connection between said oscillatable disc and said one gear for yieldingly oscillating the same.

13. The combination defined in claim 12, wherein said oscillatable disc is in face-to-face frictional engagement with said one gear; and including a shaft on which both of said gears are rotatably mounted, and a spring yoke attached to said shaft and yieldingly bearing against said disc to establish said frictional engagement.

No references cited.